(12) United States Patent
Turner (10) Patent No.: US 8,889,012 B2
(45) Date of Patent: Nov. 18, 2014

(54) THICKENER/CLARIFIER FEEDWELL ASSEMBLY WITH INFEED ROTATION

(75) Inventor: Simon Turner, West Gosford (AU)

(73) Assignee: FLSmidth A/S, Valby (DK)

(*) Notice: Subject to any disclaimer, the term of this patent is extended or adjusted under 35 U.S.C. 154(b) by 654 days.

(21) Appl. No.: 13/203,140

(22) PCT Filed: Feb. 24, 2010

(86) PCT No.: PCT/IB2010/050808
§ 371 (c)(1),
(2), (4) Date: Aug. 24, 2011

(87) PCT Pub. No.: WO2010/097762
PCT Pub. Date: Sep. 2, 2010

(65) Prior Publication Data
US 2012/0012534 A1 Jan. 19, 2012

(30) Foreign Application Priority Data
Feb. 26, 2009 (DK) .................................. 2009 00262

(51) Int. Cl.
*B01D 21/24* (2006.01)
*C02F 1/52* (2006.01)

(52) U.S. Cl.
CPC .......... *B01D 21/2411* (2013.01); *C02F 1/5227* (2013.01)
USPC ........... 210/738; 210/801; 210/208; 210/519; 210/520

(58) Field of Classification Search
CPC .... B01D 21/01; B01D 21/24; B01D 21/2411; C02F 1/5227; B01F 15/0202
USPC ......... 210/738, 800, 801, 207, 208, 519, 520, 210/532.1
See application file for complete search history.

(56) References Cited

U.S. PATENT DOCUMENTS

| 973,424 A | * | 10/1910 | Greth | ............................ 210/207 |
| 3,006,474 A | | 10/1961 | Fitch | |
| 3,487,017 A | * | 12/1969 | Thorn | ........................... 210/208 |

(Continued)

FOREIGN PATENT DOCUMENTS

| WO | 0119488 A1 | 3/2001 |
| WO | 2007061599 A1 | 5/2007 |
| WO | 2007083053 A2 | 7/2007 |
| WO | 2008053065 A1 | 5/2008 |

OTHER PUBLICATIONS

International Search Report for PCT/IB2010/050808 dated Jul. 26, 2010.

(Continued)

*Primary Examiner* — Christopher Upton
(74) *Attorney, Agent, or Firm* — Buchanan Ingersoll & Rooney, PC (57) ABSTRACT

A feedwell assembly for a thickener/clarifier includes a feedwell body, at least one infeed conduit connected at a downstream end to the body, and at least one spin or rotation inducement element disposed as part of the infeed conduit for imparting rotation or spin to a slurry stream fed to the feedwell body via the infeed conduit. The spin or rotation inducement element may be a fixed and rigid structural member such as a vane or baffle, or include actively operated elements. Multiple such spin or rotation inducement elements may be provided in various locations in or adjacent the infeed conduit.

18 Claims, 6 Drawing Sheets

(56) References Cited

U.S. PATENT DOCUMENTS

| | | | |
|---|---|---|---|
| 3,539,051 A * | 11/1970 | Stone | 210/520 |
| 4,054,514 A * | 10/1977 | Oltmann | 210/208 |
| 4,278,541 A | 7/1981 | Eis et al. | |
| 5,407,584 A | 4/1995 | Broussard, Sr. | |
| 7,083,050 B2 * | 8/2006 | Nyman et al. | 210/519 |
| 2008/0110839 A1 | 5/2008 | Foreman et al. | |
| 2009/0173701 A1 | 7/2009 | Egan, III | |
| 2011/0192780 A1 * | 8/2011 | Beaulieu | 210/202 |

OTHER PUBLICATIONS

Written Opinion of the International Searching Authority of PCT/IB2010/050808 dated Jul. 26, 2010.

* cited by examiner

THICKENER/CLARIFIER FEEDWELL ASSEMBLY WITH INFEED ROTATION

CROSS REFERENCE TO RELATED APPLICATION

This application is the United States national stage under 35 U.S.C. §371 of International Application No. PCT/IB2010/050808, filed on Feb. 24, 2010, which claimed priority to Danish Patent Application No. PA 200900262, filed on Feb. 26, 2009. The entirety of these applications is incorporated by reference herein.

FIELD OF THE INVENTION

This invention relates to thickener/clarifier tanks used to separate liquid and solids components of an influent feed slurry and specifically relates to feedwell apparatus employed in such thickener/clarifiers to enhance the separation process.

BACKGROUND OF THE INVENTION

Thickener/clarifier tanks are used in a wide variety of industries to separate influent feed slurry comprising a solids, or particulate containing, fluid to produce a "clarified" liquid phase having a lower concentration of solids than the influent feed slurry and an underflow stream having a higher concentration of solids than the influent feed slurry. Thickener/clarifier tanks conventionally comprise a tank having a floor and a continuous wall, which define a volume within which the clarification process takes place. Thickener/clarifier tanks also include an influent feed pipe for delivering influent feed to the tank, an underflow outlet for removing settled solids from the tank and a fluid discharge outlet for directing clarified liquid away from the tank. Thickener/clarifier tanks may also include a rake assembly having rake arms for sweeping along the floor of the tank, and may include an overflow launder or bustle pipe for collecting clarified liquid near the top of the tank.

Thickener/clarifier tanks of the type described operate by introducing an influent feed stream into the volume of the tank where the influent is retained for a period long enough to permit the solids to settle out by gravity from the fluid. The solids that settle to the bottom of the tank produce a sludge bed near the bottom of the tank, which is removed through the underflow outlet. Clarified liquid is formed at or near the top of the thickener/clarifier tank and is directed away from the tank for further processing or disposal. Settling of solids may be enhanced in some applications by the addition of a flocculent or polymer that forms agglomerates that settle more readily. In many applications, an objective of fluid clarification is to enhance the settling process to achieve a high throughput of solids, and thereby enhance solids recovery.

Many thickener/clarifier tanks are constructed with a feedwell, usually centrally located within the tank, into which the influent feed stream is delivered. The feedwell generally serves the purpose of reducing the fluid velocity of the incoming influent feed stream so that the energy in the stream may be dissipated to some degree before entering the tank. Dissipation of energy in the influent feed stream lessens the disruptive effect that the incoming influent feed has on the settling rate of the solids in the tank. In other words, introduction into a thickener/clarifier of an influent feed stream under high fluid velocity tends to cause turbulence in the tank and compromises the settling rate of solids. A feedwell may be structured in a variety of ways, therefore, to create or enhance dissipation of energy in the influent feed. See, e.g., U.S. Pat. No. 3,006,474 to Fitch and U.S. Pat. No. 4,278,541 to Eis, et al.

SUMMARY OF THE INVENTION

It is an object of the present invention to provide an improved feedwell assembly for thickener/clarifiers.

A more specific object of the present invention is to provide a feedwell assembly with improved or enhanced mixing of an incoming slurry with a flocculent, and to develop specific flow patterns of the feed fluid within the feedwell that improve mixing and retention time to thus improve the efficiency of the feedwell.

An even more specific object of the present invention is to provide such a feedwell assembly wherein mixing is enhanced in part by delaying a falling of suspended particulates into the thickener/clarifier tank from the feedwell.

Another object of the present invention is to provide an improved method for operating a thickener/clarifier with a feedwell assembly.

A related object of the present invention is to provide such a method that improves or enhances mixing of an incoming slurry with a flocculent.

A more particular object of the present invention is to provide such a method that delays the descent of suspended particulates into the thickener/clarifier tank from the feedwell.

These and other objects of the present invention will be apparent from the drawings and description herein. Although every object of the invention is believed to be attained by at least one embodiment of the invention, there is not necessarily any one embodiment of the invention that achieves all of the objects of the invention.

A feedwell assembly for a thickener/clarifier comprises, in accordance with the present invention, a feedwell body, at least one infeed conduit operatively connected to the body, and at least one spin or rotation inducement element disposed as part of the infeed conduit for imparting rotation or spin to a slurry stream fed to the feedwell body via the infeed conduit. The infeed conduit may, for example, connect to or simply extend towards, over or into the feedwell body in order to deliver the slurry stream thereto.

Preferably, the spin or rotation inducement element takes the form of a fixed and rigid structural member such as a vane or baffle. Multiple such elements may be provided in and/or at various locations in the infeed conduit. Alternatively or additionally, the spin or rotation inducement element may include an active element such as a rotary motor based spinning element.

Where the infeed conduit is connected to the feedwell body to deliver the slurry stream to flow along a circular path inside the feedwell body, the slurry stream having a substantially circular inner boundary and a substantially circular outer boundary extending parallel to the path, the spin or rotation inducement element is preferably configured for providing the slurry stream with an upward velocity component at the inner boundary of the circular path and a downward velocity component at the outer boundary along the feedwell sidewall.

In some embodiments of a feedwell assembly, the feedwell body may be provided along an inner side with a shelf or ledge. The circular flow path of the slurry stream is then located above the shelf or ledge. The shelf or ledge may be provided along an inner edge with an upwardly turned lip that assists in maintaining the rotation or spin of the slurry stream on the feedwell shelf and delaying the descent of slurry particulates into a tank of the thickener/clarifier. The longer residence time in the feedwell body increases the mixing of flocculent and slurry.

In some embodiments of a feedwell assembly, the infeed conduit is one of at least two infeed conduits connected at downstream ends to the feedwell body at locations spaced longitudinally and circumferentially along the feedwell body. Pursuant to the present invention, each of the infeed conduits is preferably provided with at least one spin or rotation inducement element disposed in the respective infeed conduit for imparting rotation or spin to a slurry stream fed to the feedwell body via the respective infeed conduit. The infeed conduits are connected to the feedwell body to deliver respective slurry stream portions to flow along respective circular paths inside the feedwell body, the slurry stream portions each having a substantially circular inner boundary and a substantially circular outer boundary extending parallel to the respective circular path. The spin or rotation inducement elements are configured for providing the slurry stream portions with an upward velocity component at the respective inner boundary and a downward velocity component at the respective outer boundary along the feedwell sidewall.

In some embodiments of a feedwell assembly, an infeed conduit includes an eductor structure for diluting the slurry stream with clarified liquid in a thickener/clarifier tank. In that case, at least one spin or rotation inducement element is preferably included as part of the eductor structure, either upstream and/or downstream of the eduction mechanism.

The infeed conduit may be a pipe or, alternatively, an open channel in whole or in part, or a mix tube or channel following an eductor, and the infeed conduit assembly may also include a pumping and/or mixing impeller or impellers.

A feedwell assembly in accordance with the present invention typically has at least one inlet connected to the infeed conduit for introducing a flocculent to the slurry stream, the inlet being disposed downstream of the at least one spin or rotation inducement element.

A slurry feed assembly for a thickener/clarifier comprises, in accordance with the present invention, at least one infeed conduit connectable at a downstream end to a feedwell body and at least one spin or rotation inducement element disposed in the infeed conduit for imparting rotation or spin to a slurry stream fed to the feedwell body via the infeed conduit.

The infeed conduit is typically connectable to the feedwell body to deliver the slurry stream to flow along a circular path inside the feedwell body, so that the slurry stream has a substantially circular inner boundary and a substantially circular outer boundary extending parallel to the path. The spin or rotation inducement element is configured for providing the slurry stream with an upward velocity component at the inner boundary and a downward velocity component at the outer boundary of the circular flow path.

Where the infeed conduit is one of at least two infeed conduits connectable at downstream ends to the feedwell body at locations spaced longitudinally and circumferentially along the feedwell body, each of the infeed conduits is provided with at least one spin or rotation inducement element disposed in the respective infeed conduit for imparting rotation or spin to a slurry stream fed to the feedwell body via the respective infeed conduit. The infeed conduits are preferably connectable to the feedwell body to deliver respective slurry stream portions to flow along respective circular paths inside the feedwell body, the slurry stream portions each having a substantially circular inner boundary and a substantially circular outer boundary extending parallel to the respective circular path. The spin or rotation inducement elements are configured for providing the slurry stream portions with an upward velocity component at the respective inner boundary and a downward velocity component at the respective outer boundary.

The infeed conduit may include, be provided with, or may be utilizable with an eductor structure for diluting the slurry stream with clarified liquid from a thickener/clarifier tank. In that case, the at least one spin or rotation inducement element can be disposed upstream and/or downstream of the eductor structure or even/also within the eductor nozzle itself.

Furthermore, the infeed conduit, and eductor structure, if included, may be provided in various orientations, e.g., from a horizontal position all the way up to a completely vertical orientation.

The infeed conduit preferably has at least one inlet for introducing a flocculent to the slurry stream, the inlet being disposed downstream of the at least one spin or rotation inducement element.

A method for enhancing mixing of a slurry stream and a flocculent in a feedwell of a thickener/clarifier comprises, in accordance with the present invention, (a) disposing, in an infeed conduit of a feedwell body, a spin or rotation inducement element, (b) attaching the spin or rotation inducement element to the infeed conduit, (c) flowing a slurry stream through the infeed conduit, (d) by virtue of configuration and disposition of the spin or rotation inducement element, imparting rotation or spin to the slurry stream, and (e) feeding the slurry stream having the rotation or spin to the feedwell body from the infeed conduit.

Where the slurry stream flows along a circular path inside the feedwell body, the feeding of the slurry stream to the feedwell body includes providing the slurry stream with an upward velocity component at an inner boundary of a substantially circular flow path in the feedwell body and a downward velocity component at an outer boundary of the circular flow path.

Where the feedwell body is provided along an inner side with a shelf or ledge, the rotation or spin of the slurry stream tends to increase the retention time of particulate matter in the slurry stream on or over the shelf or ledge.

Where the infeed conduit is one of at least two infeed conduits connected at downstream ends to the feedwell body at locations spaced longitudinally and circumferentially along the feedwell body, the method may further comprise (i) mounting, in each of the infeed conduits, a respective spin or rotation inducement element, (ii) subsequently flowing slurry streams through each of the infeed conduits, (iii) by virtue of configuration and disposition of the spin or rotation inducement elements, imparting rotation or spin to the slurry streams flowing through the infeed conduits, and (iv) feeding the slurry streams having respective rotation or spin to the feedwell body from the respective infeed conduits, the rotations or spins imparted to the slurry streams being in opposite directions.

Where the infeed conduit includes an eductor structure for diluting the slurry stream with clarified liquid in a thickener/clarifier tank, the disposing of the at least one spin or rotation inducement element includes disposing the at least one spin or rotation inducement element preferably upstream of, or within, the eductor structure, although a downstream installation is also possible.

Where the at least one spin or rotation inducement element takes the form of a vane, it may be mounted to the infeed conduit by welding or bolting. The method contemplates the retrofitting of existing feedwell assemblies with spin inducement elements.

The method preferably includes introducing a flocculent to the slurry stream downstream of the at least one spin or rotation inducement element.

Other details, objects, and advantages of the invention will become apparent as the following description of certain present preferred embodiments thereof and certain present preferred methods of practicing the same proceeds.

DETAILED DESCRIPTION OF PRESENT PREFERRED EMBODIMENTS

Figure 1:
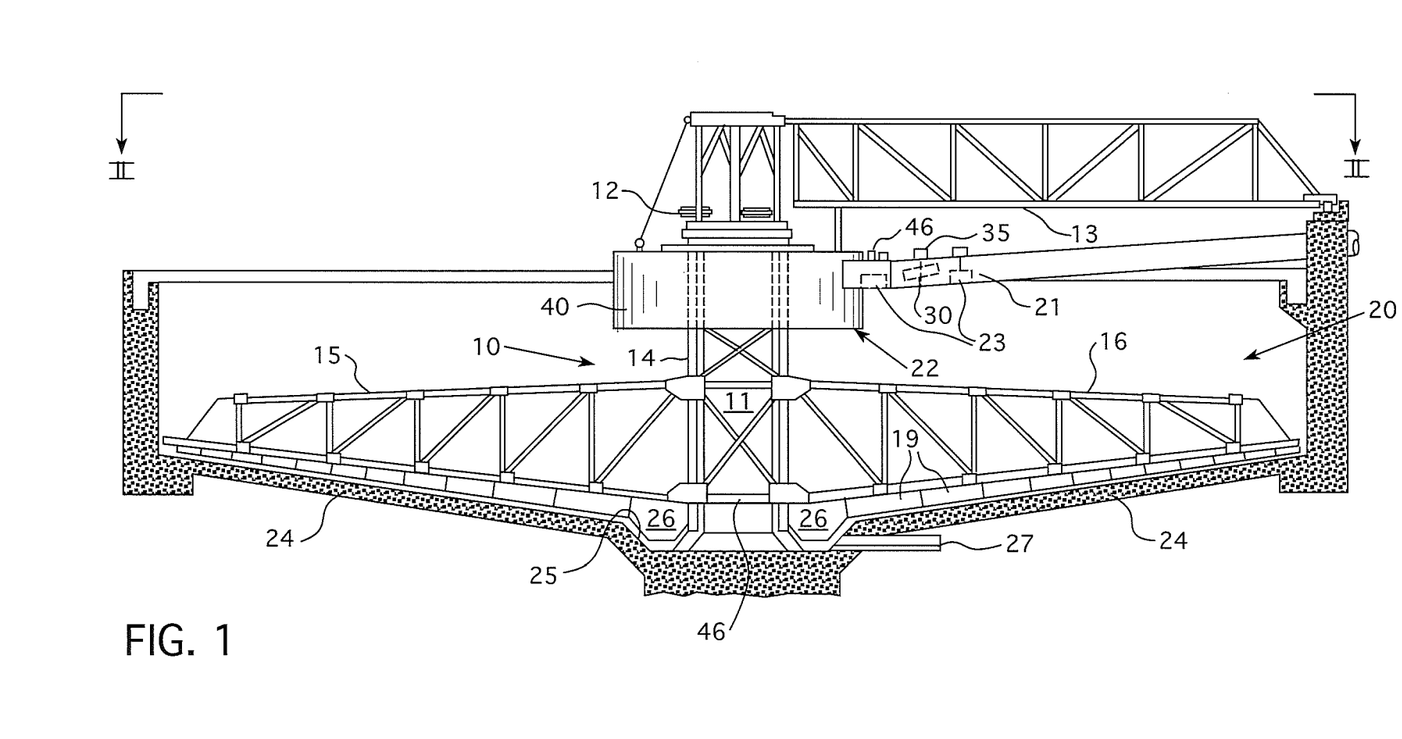
FIG. 1 is a vertical sectional view of a thickener/clarifier tank having a center pier supporting a rotating sludge raking structure and a feedwell assembly with a spin inducement vane in accordance with the present invention.
Figure 2:
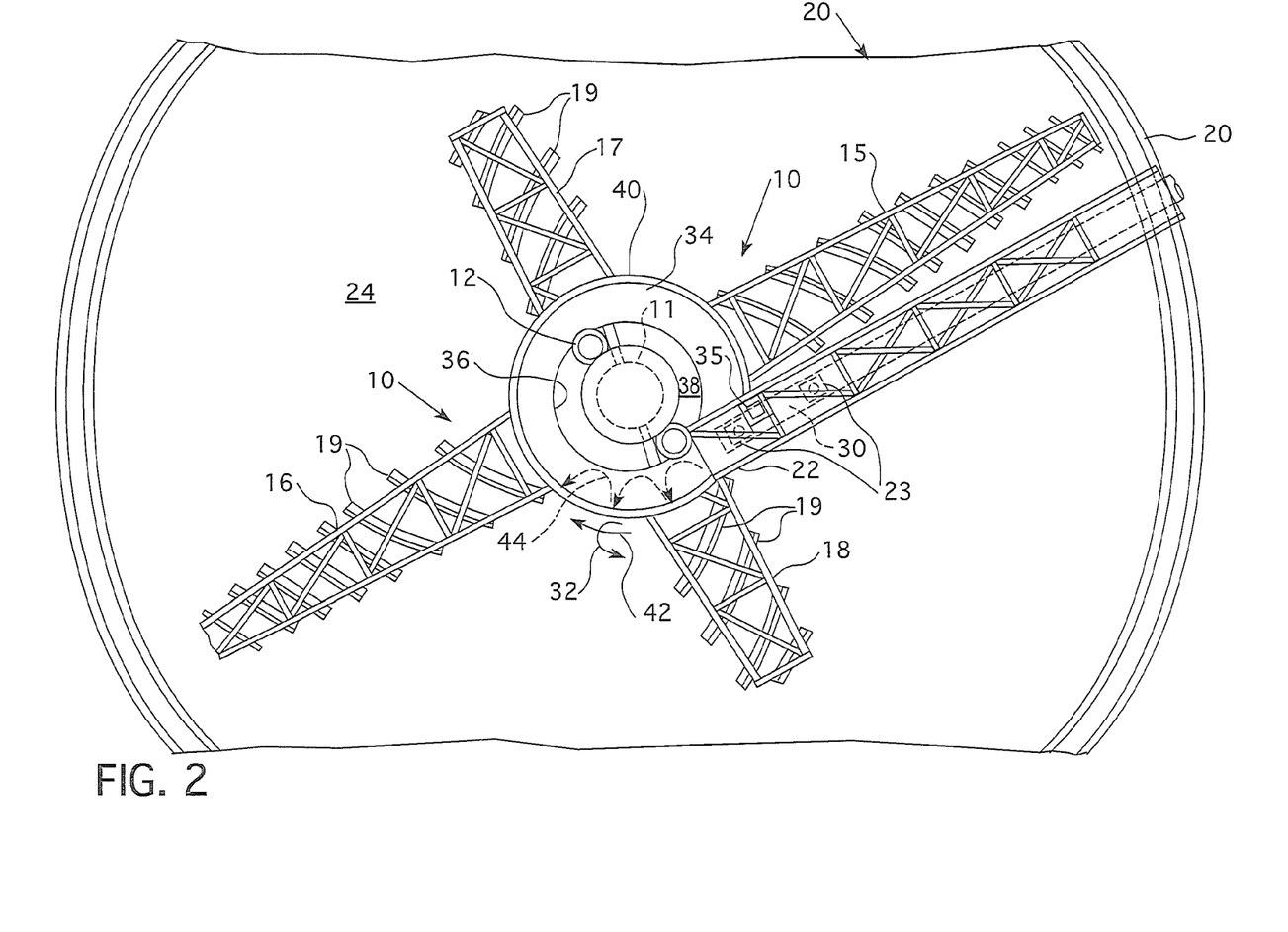
FIG. 2 is a plan view of the thickener/clarifier tank of FIG. 1, taken on line II-II in FIG. 1.

As illustrated in FIGS. 1 and 2, a thickener/clarifier comprises a continuously operating thickening tank wherein a sludge raking structure 10 is supported for rotation upon a center pier 11, or from a bridge drive (not shown). A drive mechanism 12 of any suitable known construction is mounted atop the pier, or from a bridge, providing the driving torque for the rake structure. In this particular embodiment, the pier also supports the inner end of an access bridge 13, while some thickener mechanisms are bridge mounted.

Rake structure 10 comprises a central vertical cage portion or cage 14 surrounding the pier, and rake arms of girder like construction extending rigidly from the cage. Rake structure 10 has one pair of long rake arms 15 and 16 opposite to one another, and, if required, a pair of short rake arms 17 and 18 disposed at right angles thereto, all arms having sludge impelling or conveying blades 19 fixed to the underside thereof.

Rake structure 10 operates in a settling tank 20 to which a feed suspension or feed pulp is supplied through feed pipe or infeed conduit 21 terminating in a cylindrical feedwell body 22 which surrounds the top end portion of the rake structure and is supported by pier 11.

Tank 20 may be of usual construction, comprising a bottom 24 of shallow inverted conical inclination, and formed with an annular sump 25 around the pier, to which settled solids or sludge are conveyed by rake structure 10. Scraper blades 26, unitary with rake structure 10 and substantially conforming to the profile of sump 25, move the collected sludge to a point of delivery from the sump, as by way of a discharge pipe 27.

Infeed conduit 21 is generally connected at a downstream end to feedwell body 22, although the infeed conduit 21 could simply extend to or over the feedwell body 22 to deliver the slurry stream 42 thereto. At least one spin or rotation inducement element 30 is disposed in infeed conduit 21 for imparting a rotation or spin 32 (FIG. 2) to a slurry stream 42 fed to feedwell body 22 via the infeed conduit. Spin or rotation inducement element 30 may take the form of a fixed and rigid structural member such as an at least partially helical vane or baffle. Multiple such elements may be provided in the infeed conduit 21. Such a spin or rotation inducing element 30 may also optionally include, or be comprised entirely of, an active, perhaps motor driven, element 35 such as a moving blade, vane, impeller and/or propeller. The infeed conduit 21 may also include a pumping and/or mixing assist assembly 23, variously located in the infeed conduit 21, which assembly may or may not be in open communication with the surrounding liquid volume inside the thickener tank 20.

Feedwell body 22 has an annular floor panel 34 (FIG. 2) with an inner edge 36 defining a circular opening 38 and an outer edge contiguous with a cylindrical sidewall 40 of the feedwell body. Infeed conduit 21 is connected to feedwell body 22 so as to deliver slurry stream 42 to flow along a circular path inside the feedwell body. Slurry stream 42 has a substantially circular inner boundary located generally above inner edge 36 and a substantially circular outer boundary located adjacent feedwell sidewall 40. The inner and outer boundaries extend parallel to the path of the slurry stream 42. Spin or rotation inducement element 30 is so configured as to provide the slurry stream 42 with an upward velocity component at the inner boundary of the circular path and a downward velocity component at the outer boundary. This spin or rotation provides particulates in the slurry stream 42 with a helical travel path 44 and serves to extend the time that the slurry remains in the feedwell body 22, moving along bottom panel or shelf 34, and delays the descent of the particulates through opening 38 into tank 20. The extended residence time in feedwell body 22 increases the degree of mixing of a flocculent with the slurry stream 42, the flocculent being delivered via one or more inlet ports 46 communicating with infeed conduit 21 and/or feedwell body 22.

Figures 3, 4, 5:
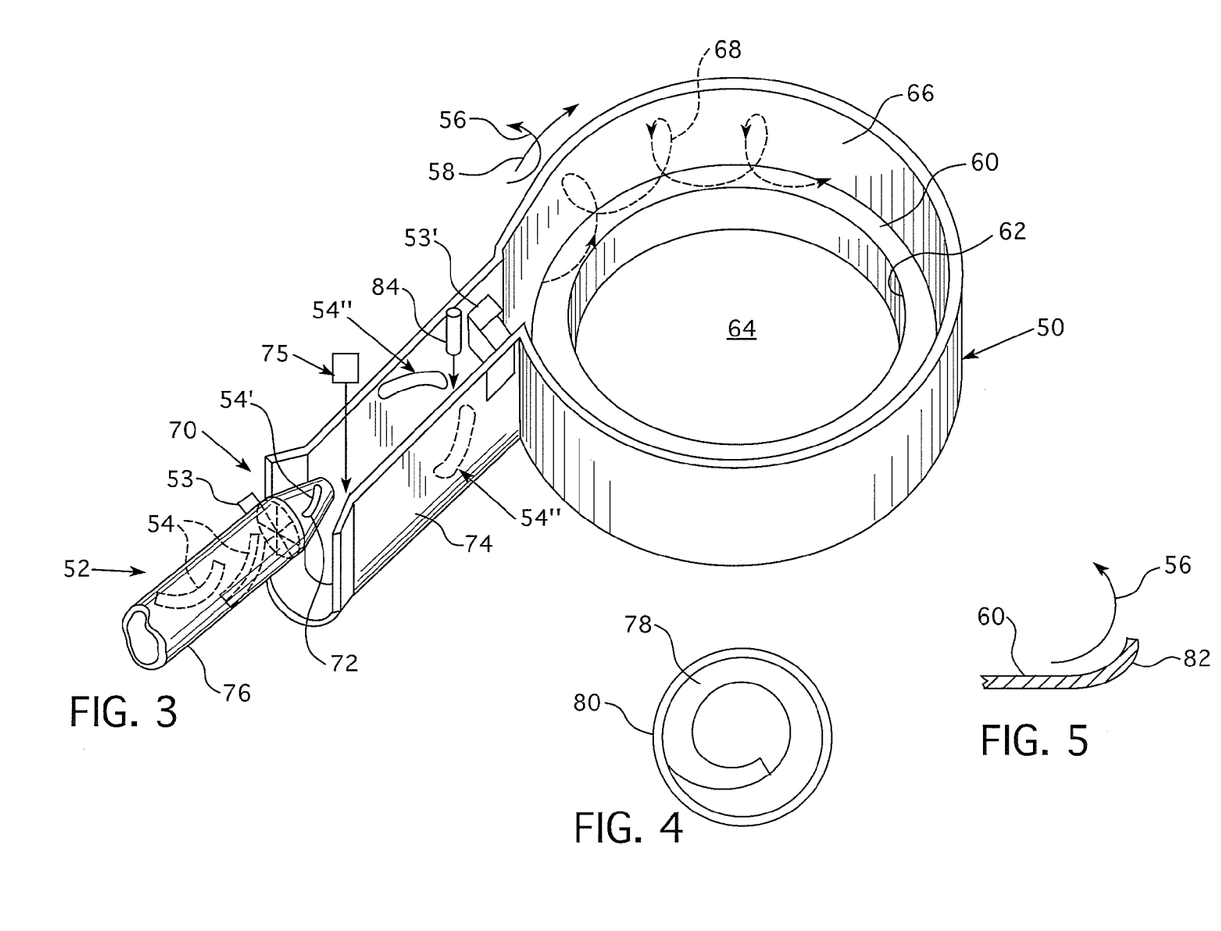
FIG. 3 is a schematic perspective view of another feedwell for a thickener/clarifier, having a spin or rotation inducement vane in accordance with the present invention.
FIG. 4 is a schematic end elevational view of a feedwell infeed pipe having a spin or rotation inducement vane in accordance with the present invention.
FIG. 5 is a schematic partial cross-sectional view of a modification of a shelf or ledge in the feedwell assembly of FIG. 3.

As depicted in FIG. 3, a feedwell assembly for a thickener/clarifier comprises a feedwell body 50, an infeed conduit 52 connected at a downstream end to the body, and one or more spin or rotation inducement elements 54 disposed in the infeed conduit for imparting rotation or spin 56 to a slurry stream 58 fed to the feedwell body via the infeed conduit. Spin or rotation inducement elements 54 each take the form of a fixed and rigid structural member such as a helical thread, vane or baffle, although they could include or take the form of an active element 53 and/or 53', such as a rotatable, possibly motor driven, vane, blade, impeller and/or propeller as well.

Infeed conduit 52 is connected generally tangentially to feedwell body 50 to deliver slurry stream 58 to flow along a circular path inside the feedwell body.

Feedwell body 50 has an annular floor panel 60 with an inner edge 62 defining a circular opening 64 and an outer edge contiguous with a cylindrical sidewall 66 of the feedwell body. Infeed conduit 52 is so connected to feedwell body 50 that slurry stream 58 flows along a circular path inside the feedwell body. Slurry stream 58 has a substantially circular inner boundary located generally above inner edge 62 and a substantially circular outer boundary located adjacent feedwell sidewall 66. The inner and outer boundaries extend parallel to the path of the slurry stream 58. Spin or rotation inducement elements 54 are so configured as to provide the slurry stream 58 with an upward velocity component at the inner boundary of the circular path and a downward velocity component at the outer boundary. This spin or rotation provides particulates in the slurry stream 58 with a helical travel path 68 and serves to extend the time that the slurry remains in the feedwell body 50, moving along floor panel, shelf or ledge 60, and delays the descent of the particulates through opening 64 into the surrounding thickener/clarifier tank (e.g., 20 in FIGS. 1 and 2).

As further depicted in FIG. 3, infeed conduit 52 as shown therein incorporates an eductor structure 70 including a nozzle 72 extending into an open channel 74 for diluting the slurry stream 58 with clarified liquid from the surrounding thickener/clarifier tank, via a momentum transfer process. Spin or rotation inducement elements 54 are disposed in a pipe component 76 of infeed conduit 21, upstream of eductor structure 70. Alternatively, similar such spin or rotation inducing elements 54' could be disposed in the eductor nozzle 72 or even inside the open channel 74, shown as elements 54". The open channel 74 could also optionally include a pumping and/or mixing assisting assembly 75, which may or may not be open to the liquid in the surrounding thickener/clarifier tank (e.g., 20 in FIGS. 1 and 2).

As shown in FIG. 4, a spin or rotation inducement element 78 mounted inside an infeed pipe 80 may take the form of a helical thread or vane.

As illustrated in FIG. 5, floor panel, shelf or ledge 60 of feedwell body 50 (FIG. 3) may be provided along an inner edge with an upwardly turned lip 82 that assists in maintaining the rotation or spin 56 of the slurry stream 58 on the feedwell shelf and delaying the descent of slurry particulates through opening 64 into a tank of the thickener/clarifier. The longer residence time in feedwell body 50 increases the mixing of flocculent and slurry stream 58. The flocculent is delivered via one or more inlet ports 84 (FIG. 3) communicating with infeed conduit 21 and/or feedwell body 22.

Figure 6:
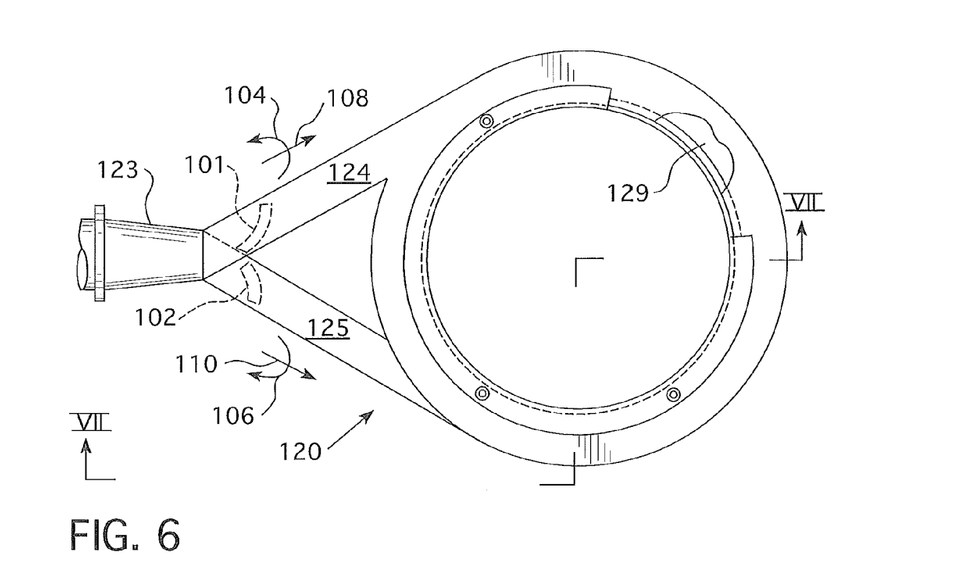
FIG. 6 is a top plan view of another feedwell assembly having spin or rotation inducement elements in a pair of infeed conduits, in accordance with the present invention.
Figure 7:
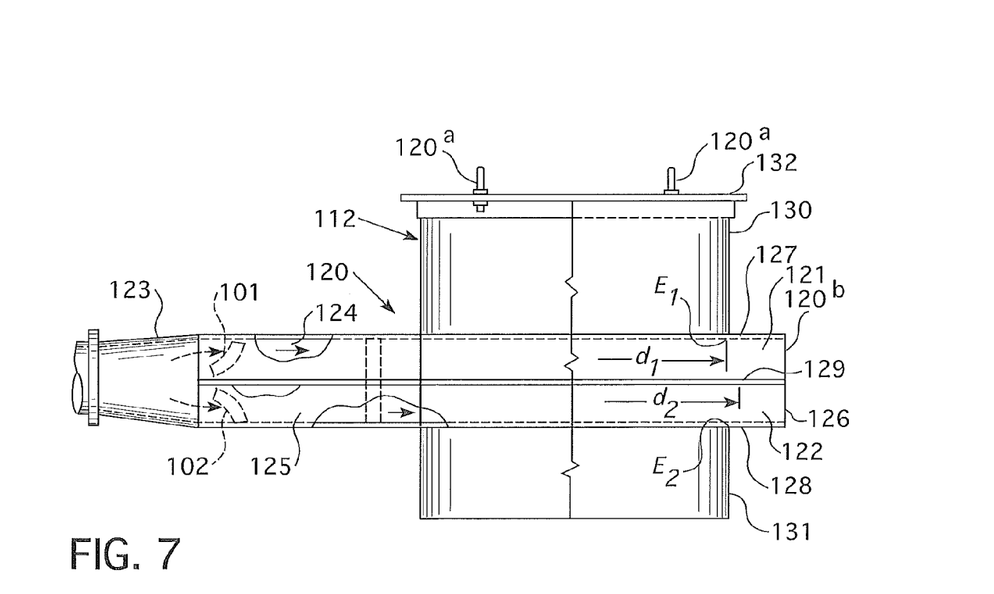
FIG. 7 is a partially a side elevational view and partially a cross-sectional view taken along line VII-VII in FIG. 6.

As depicted in FIGS. 6 and 7, a feedwell assembly employed in conjunction with a settling or thickener/clarifier tank (e.g., 20 in FIGS. 1 and 2) comprises an infeed conduit 120 providing a pair of circular horizontal coaxial feed channels, namely, an upper feed channel 121 and a lower feed channel 122, both supplied by a common feed conduit 123 which splits into an upper branch 124 leading tangentially into the upper feed channel and a lower branch 125 leading tangentially into the lower feed channel 122 although in a direction opposite to the direction of the upper tangential feed branch 124.

Infeed conduit structure 120 comprises a cylindrical wall portion 126, an upper annular wall portion 127, a lower annular wall portion 128, as well as an intermediate annular divisional wall portion 129, all extending inwardly from the cylindrical wall portion, an inner diameter $d_1$ of the annular portions 127 and 128 being smaller than the inner diameter $d_2$ of the intermediate divisional annular portion or shelf 129.

From an inner peripheral edge E1 of the upper annular wall portion 127 upwardly there extends an upper cylindrical feedwell portion 130, whereas from an inner peripheral edge E2 downwardly there extends a lower cylindrical feedwell portion 131. The upper end of the feedwell assembly has a flange 132 held by suspension bolts 120a.

Each of the infeed conduit branches 124 and 125 is provided with at least one spin or rotation inducement element 101, 102 (vane, baffle, turbine) disposed in the respective infeed conduit branch 124, 125 for imparting rotation or spin 104, 106 to a slurry stream 108, 110 fed to a feedwell body 112 (including upper cylindrical feedwell portion 130 and lower cylindrical feedwell portion 131) via the respective infeed conduit branch, 124, 125. The infeed conduit branches 124 and 125 are connected to the feedwell body 112 to deliver respective slurry stream portions 108 and 110 to flow along respective circular paths inside the feedwell body 112. The slurry stream portions 108 and 110 each have a substantially circular inner boundary and a substantially circular outer boundary extending parallel to the respective circular path. Spin or rotation inducement elements 101, 102 are configured for providing the slurry stream portions 108, 100 with an upward velocity component at the respective inner boundary and a downward velocity component at the respective outer boundary. The rotations or spins imparted to the slurry streams 108 and 110 are opposite in direction, since the slurry stream travel in different directions about the feedwell.

Figure 8:
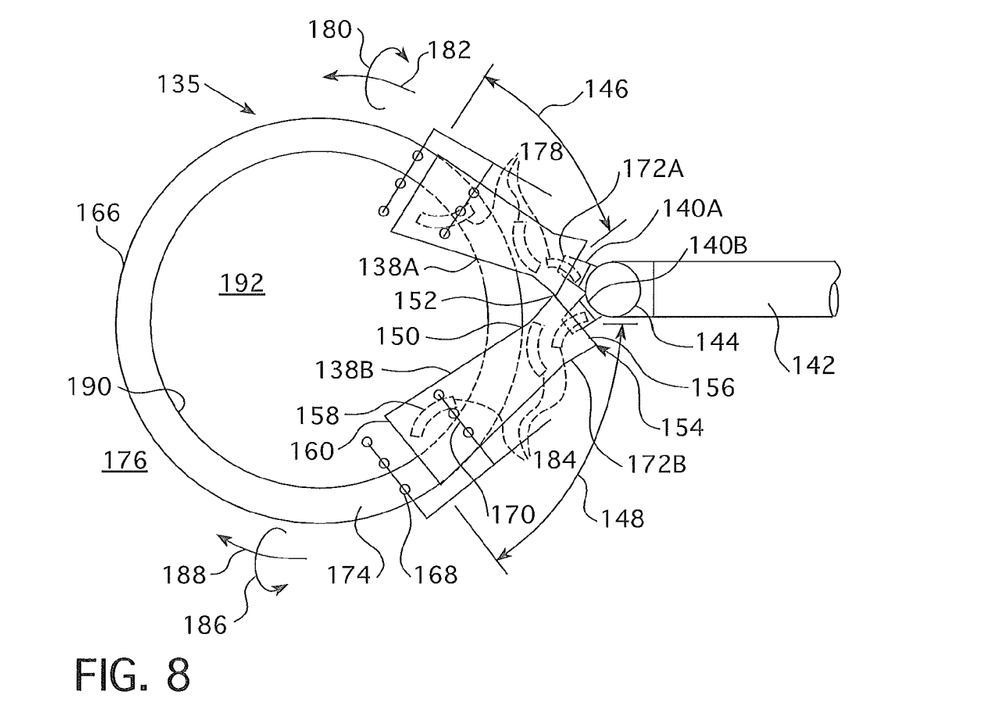
FIG. 8 is a schematic top plan view of another feedwell assembly having spin or rotation inducement elements in a pair of infeed conduits, in accordance with the present invention.
Figure 9:
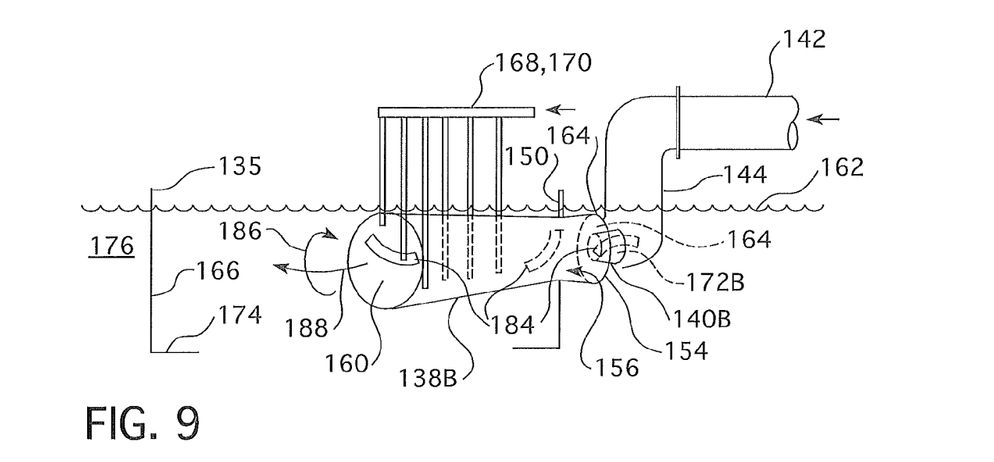
FIG. 9 is a schematic side elevational view of a portion of the feedwell assembly of FIG. 8.

FIGS. 8 and 9 show a substantially circular self-diluting eductive feedwell assembly 135 having a pair of eductor tubes 138A and 138B that receive respective influent feed streams of a slurry from respective directional nozzles 140A and 140B supplied by a feed pipe 142 through feed manifold 144. Feed pipe 142, manifold 144, nozzles 140A and 140B and eductor tubes 138A and 138B together form an infeed conduit (not separately labeled). Feedwell assembly 135 is disposed in a settling tank (e.g., thickener/clarifier tank 20 in FIGS. 1 and 2). The two nozzle and tube eductor assemblies, bracketed and indicated by reference numbers 146 and 148, are substantially identical and function in the same manner, but are in contraposition to each other. Each eductor assembly 146 and 148 is oriented so that flow therethrough and into a feedwell body 166 is substantially tangential to the arc of the feedwell outer wall (not separately designated). To simplify discussion of the assemblies, only assembly 148 will be described in detail.

Eductor tube 138B has a generally cylindrical shape with a constriction in diameter or throat 150 adjacent an inlet end 152. Inlet end 152 has an inlet port 154 opening into an internal passageway 156 extending the length of eductor tube 138B. The inside diameter of internal passageway 156 constricts at throat 150 and then gradually enlarges between throat 150 and a discharge end 158 having a discharge port 160.

As depicted in FIG. 9, eductor tube 138B is mounted with respect to feedwell body 166 so that inlet port 154 of the eductor tube 138B is below the surface of liquid 176 in the settling or thickener/clarifier tank. Directional nozzle 140B is mounted in the tank and positioned so that the nozzle is inserted into inlet port 154 and directed into internal passageway 156. The outside diameter of directional nozzle 140B is smaller than the inside diameter of inlet port 154 so that an annular gap 164 is defined between the nozzle 140B and the interior wall of eductor tube 138B. Annular gap 164 is in fluid communication with the clarified liquid in the settling or thickener/clarifier tank.

As shown in FIG. 8, internal passageway 156 of eductor tube 138B opens through discharge port 160 into a volume bounded by the generally circular feedwell outer wall of feedwell body 166. A flocculating header 168 may be located proximal discharge end 158 of eductor tube 138B to add a flocculent to influent flowing through the eductor tube 138B.

A second flocculating header 170 may be disposed within internal passageway 156 according to the requirements of a particular application.

One or more spin or rotation inducement elements 178 are disposed in nozzle and/or eductor tube assembly 146 for imparting a rotation or spin 180 to a slurry stream 182 fed to feedwell body 166 via the nozzle and eductor tube assembly 146. Similarly, one or more spin or rotation inducement elements 184 are disposed in nozzle and/or eductor tube assembly 148 for imparting a rotation or spin 186 to a slurry stream 188 fed to feedwell body 166 via the nozzle and eductor tube assembly 148. Spin or rotation inducement elements 178 and 184 are preferably fixed and rigid structural members such as at least partially helical threads, vanes or baffles, although they could include an active element such as a movable, possibly motor assisted, vane, blade, impeller and/or propeller.

Feedwell body 166 has an annular floor panel 174 with an inner edge 190 defining a circular opening 192 and an outer edge contiguous with the cylindrical sidewall (not separately designated) of the feedwell body. Nozzle and eductor tube assemblies 146 and 148 are at least indirectly connected to feedwell body 166 so as to deliver respective slurry streams 182 and 188 to flow along a circular path inside the feedwell body. At least immediately downstream of eductor tubes 138A and 138B, the slurry streams 182 and 188 each have a substantially circular inner boundary located generally above inner edge 190 and a substantially circular outer boundary located adjacent the feedwell sidewall. The inner and outer boundaries extend parallel to the paths of the slurry streams 182 and 188. Spin or rotation inducement elements 178 and 184 are so configured as to provide the slurry streams 182 and 188 respectively with an upward velocity component at the inner boundary of the circular path and a downward velocity component at the outer boundary (at least immediately downstream of eductor tubes 138A and 138B). The spins or rotations 180 and 186 are opposite in direction. Such spin or rotation provides particulates in the slurry streams 182 and 188 with helical travel paths (not shown) and serves to extend the time that the slurry remains in the feedwell body 166, moving along bottom panel or shelf 174, and delays the descent of the particulates through opening 192 into the tank. The extended residence time in feedwell body 166 increases the degree of mixing of a flocculent with the slurry streams 182 and 188.

By way of further description of the operation of feedwell assembly 135, an influent feed stream is pumped through feed pipe 142 and is diverted bi-directionally by manifold 144 into slurry streams 178 and 184 flowing through directional nozzles 140A and 140B and eductor tubes 138A and 138B. With respect to nozzle and tube assembly 148, the slurry stream exits the nozzle port 172B and is discharged into the internal passageway 156 of the eductor tube 138B. As the feed stream moves through the internal passageway 156, the flow velocity increases through throat 150. The flow of influent through throat 150 of eductor tube 138B causes dilution liquor from the settling tank to be educted into internal passageway 156 through the circular gap 164 between directional nozzle 140B and the interior wall of eductor tube 138B. The dilution ratio may be adjusted by raising and lowering the tubular tube 138B and directional nozzle 140B in the settling tank to control the amount of dilution liquor educted into internal passageway 156. Alternatively, eductor tubes 138A and 138B may be vertically fixed, and directional nozzles 140A and 140B horizontally movable with respect to the eductor tubes inlet ends.

Diluted influent discharged from internal passageway 156 of eductor tube 138B through discharge port 160 may be flocculated by flocculating headers 168 and 170 before being added to the volume defined by circular feedwell wall 166.

Figure 10:
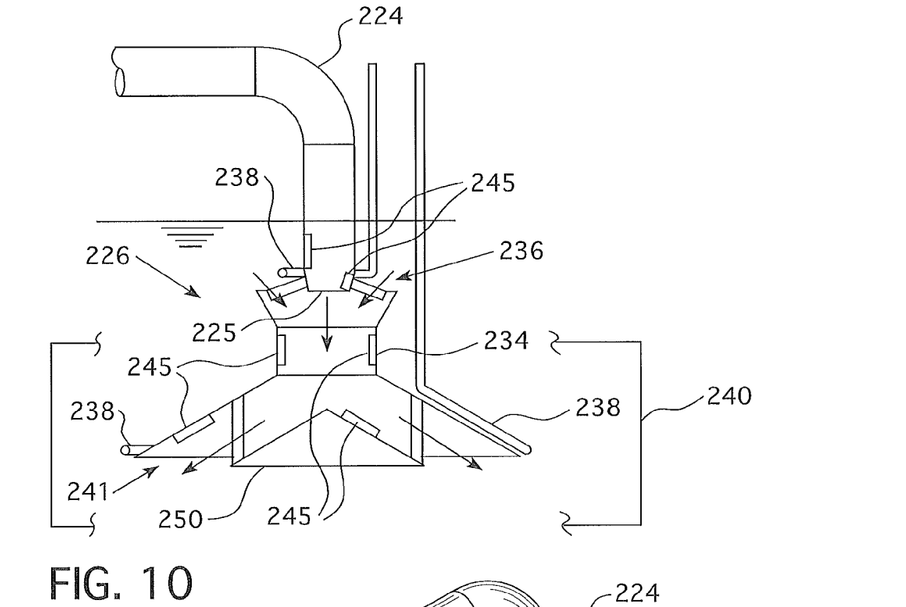
FIG. 10 is a schematic side elevational view of a vertical feedwell assembly in accordance with the present invention.
Figure 11:
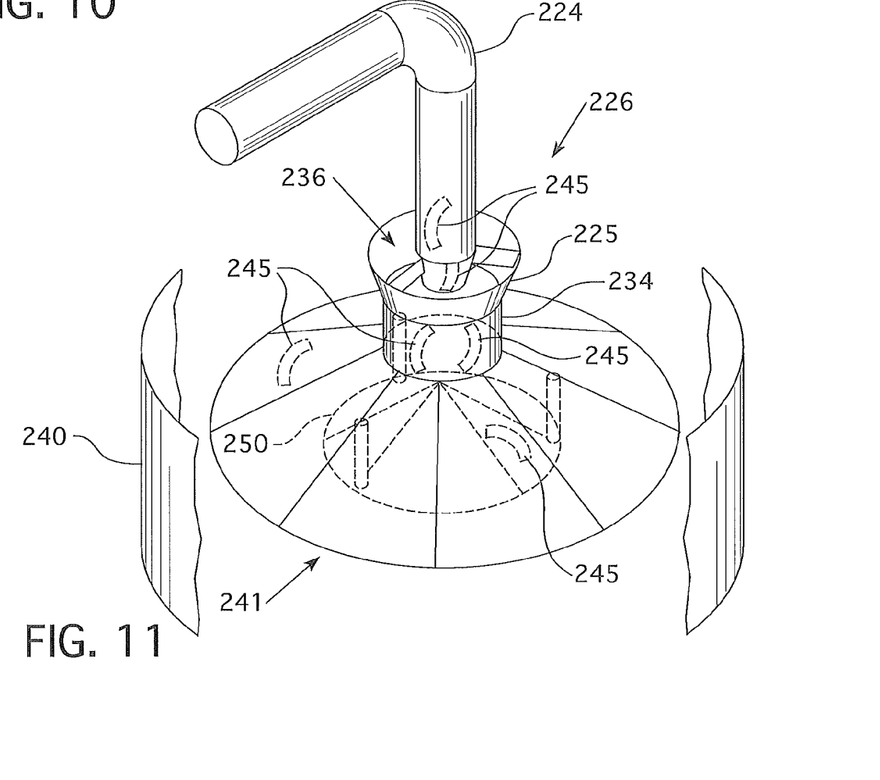
FIG. 11 is a perspective view of the vertical feedwell assembly shown in the embodiment of FIG. 10 with portions of the feedwell body cut away.

Referring now to FIGS. 10 and 11, sectional and perspective views, respectively, of a substantially vertical version of the present invention are shown. In general, the infeed conduit 226 includes a slurry feed pipe 224 which may include a constricted feed pipe outlet or nozzle 225 and which infeed conduit 226 generally and operatively extends over and possibly into the feedwell body 240. The feed pipe outlet 225 is positioned to discharge the slurry at a location proximate to a diluent inlet 236. The influent slurry exiting the feed pipe outlet or nozzle 225 serves to draw/educt clarified liquor to enter into the infeed conduit structure 226 via the diluent inlet 236. Both the influent slurry and the clarified liquor then enter a mixing tube or zone 234 wherein the diluent and influent slurry mix to form a diluted slurry. The mixed, diluted slurry then exits the infeed conduit structure 226 via a discharge zone 241 and flows into the feedwell body 240 and on to the surrounding clarifier/thickener tank (e.g., 20 in FIGS. 1 and 2). A diverter 250 may be positioned in the discharge zone 241 so as to impart a radial component to the exiting diluted slurry as it enters the larger feedwell body 240, and flocculating headers 238 may be positioned adjacent the diluent inlet 236 and/or the discharge zone 241 for introduction of a flocculating reagent.

According to the present invention, the infeed conduit 226 would further include one or more spin or rotation inducing elements 245 which would impart a rotation or spin to the slurry stream fed to the feedwell body 240. These elements 245 could be variously placed within said infeed conduit structure 226; for example, within the slurry feed pipe 224 itself, inside the constricted pipe outlet or nozzle 225, within the mixing zone 234 or even within the discharge zone 241. Furthermore, while the various spin or rotation inducing elements 245 are generally shown as fixed and rigid structural members, such at least partially curved or helical vanes or baffles, they could also include, or be comprised of, active elements such as movable, and possibly motor assisted, vanes, blades, impellers and/or propellers.

Although the invention has been described in terms of particular embodiments and applications, one of ordinary skill in the art, in light of this teaching, can generate additional embodiments and modifications without departing from the spirit of or exceeding the scope of the claimed invention. It is believed that the invention could be positioned in a variety of orientations and would be useful in virtually any type of feedwell assembly, with or without the addition of flocculent, with or without slurry dilution by eduction, with singular or multiple infeed paths, with or without spill lips (i.e., annular bottom panels or shelves in the feedwell bodies), etc. Furthermore, the invention could be located in various and/or multiple places along the infeed conduit, the infeed conduit itself could be variously configured and constructed (e.g. as a closed pipe, an open channel, a mix tube or channel from an eductor, etc.), and the invention could also be used with, or made a part of, feedwell assemblies which may also include variously configured pumping and/or mixing impellers or other such mechanical assist devices. Accordingly, it is to be understood that the drawings and descriptions herein are proffered by way of example to facilitate comprehension of the invention and should not be construed to limit the scope thereof.

The invention claimed is:

1. A feedwell assembly for a thickener/clairifer tank comprising:
    a feedwell body;
    at least one infeed conduit connected to the feedwell body; and
    at least one spin or rotation inducement element disposed in said infeed conduit for imparting rotation or spin to a slurry stream fed to said feedwell body via said infeed conduit;
    wherein said infeed conduit is connected to said feedwell body to deliver said slurry stream to flow along a circular path inside said feedwell body, said slurry stream having a substantially circular inner boundary and a substantially circular outer boundary extending parallel to said path, each of said spin or rotation inducement element being configured for providing said slurry stream with an upward velocity component at said inner boundary and a downward velocity component at said outer boundary; and
    wherein said feedwell body has an inner side, the inner side having a shelf or ledge, said circular path being disposed above said shelf or ledge.

2. The feedwell assembly of claim 1 wherein said shelf or ledge is provided along an inner edge of the inner side of the feedwell body, the inner edge having an upwardly turned lip.

3. The feedwell assembly of claim 1 wherein said infeed conduit includes an eductor structure for diluting said slurry stream with clarified liquid from a thickener/clarifier tank, and wherein said at least one spin or rotation inducement element is disposed at a location selected from the group consisting of upstream of said eductor structure and downstream of said eductor structure.

4. The feedwell assembly of claim 1 wherein said at least one spin or rotation inducement element is selected from the group consisting of vanes, baffles, propellers, impellers, helical threads, motor driven elements, and actively moving elements.

5. The feedwell assembly of claim 1 wherein said infeed conduit is a pipe, an open channel, or a mix tube.

6. The feedwell assembly of claim 1 wherein said infeed conduit includes an assembly selected from the group consisting of a pumping assembly and a mixing assembly.

7. A feedwell assembly for a thickener/clairifer tank comprising:
    a feedwell body;
    at least two infeed conduits connected to the feedwell body; and
    at least one spin or rotation inducement element disposed in each of said infeed conduits for imparting rotation or spin to a slurry stream fed to said feedwell body via said infeed conduit; and
    wherein each of said infeed conduits is connected at downstream ends to said feedwell body at locations spaced longitudinally and circumferentially along said feedwell body.

8. The feedwell assembly of claim 7 wherein said infeed conduits are connected to said feedwell body to deliver said slurry streams to flow along a circular paths inside said feedwell body, each of said slurry streams having a substantially circular inner boundary and a substantially circular outer boundary extending parallel to said path, each of said spin or rotation inducement element being configured for providing a respective one of said slurry streams with an upward velocity component at said inner boundary and a downward velocity component at said outer boundary.

9. The feedwell assembly of claim 7 wherein said infeed conduits are connected to said feedwell body to deliver slurry streams to flow along respective substantially circular paths inside said feedwell body, said slurry streams each having a substantially circular inner boundary and a substantially circular outer boundary extending parallel to the respective circular path, the spin or rotation inducement elements being configured for providing each of said slurry streams with an upward velocity component at the inner boundary of the slurry stream and a downward velocity component at the outer boundary of the slurry stream.

10. A method for enhancing mixing of a slurry stream in a feedwell of a thickener/clarifier comprising:
    positioning at least one spin or rotation inducement element in an infeed conduit that feeds a slurry material to a feedwell body;
    flowing the slurry material through said infeed conduit;
    imparting rotation or spin to said slurry material via the at least one spin or rotation inducement element;
    feeding said slurry material having said rotation or spin to said feedwell body from said infeed conduit, wherein said feedwell body has an inner side with a shelf or ledge whereupon the incoming slurry material spins; and
    flowing said slurry material along a circular path inside said feedwell body, the feeding of said slurry material to said feedwell body including providing said slurry material with an upward velocity component at an inner boundary of a substantially circular flow path and a downward velocity component at an outer boundary of said circular flow path.

11. The method of claim 10 wherein said shelf or ledge is provided along an inner edge of the inner side of the feedwell body, the inner edge defining an upwardly turned lip.

12. The method of claim 10 wherein said infeed conduit includes an eductor structure for diluting said slurry material with clarified liquid in a thickener/clarifier tank, the disposing of said at least one spin or rotation inducement element including disposing said at least one spin or rotation inducement element in a location selected from the group consisting of upstream of said eductor structure and downstream of said eductor structure.

13. The method of claim 10 wherein said at least one spin or rotation inducement element is selected from the group consisting of vanes, baffles, propellers, impellers, helical threads, motor driven elements, and actively moving elements.

14. The method of claim 10 wherein said infeed conduit is a pipe, an open channel, or a mix tube.

15. The method of claim 10 wherein flowing of the slurry material through the infeed conduit further includes a step selected from the group consisting of pumping within the infeed conduit and mixing within the infeed conduit.

16. The method of claim 10 further comprising providing a flocculent material to the slurry material within the feedwell body and wherein said imparting rotation or spin to said slurry material via the at least one spin or rotation inducement element increases a residence time of solid particulates of the slurry material within the fedweel body for mixing with the flocculent material.

17. A method for enhancing mixing of a slurry stream in a feedwell of a thickener/clarifier comprising:
    positioning at least one spin or rotation inducement element in an infeed conduit that feeds a slurry material to a feedwell body, wherein said infeed conduit is one of at least two infeed conduits connected at downstream ends to said feedwell body at locations spaced longitudinally and circumferentially along said feedwell body;

mounting, in each of said infeed conduits, a respective spin or rotation inducement element;

flowing a slurry stream through each of said infeed conduits after the spin or rotation inducement elements are mounted therein;

imparting rotation or spin to said slurry streams via the at least one spin or rotation inducement element mounted in each of the infeed conduits; and feeding said slurry streams having respective imparted rotation or spin to said feedwell body from the respective infeed conduits, the rotations or spins imparted to one of said slurry streams being in a direction of movement opposite a direction of movement of the rotations or spins imparted to the other slurry stream.

18. The method of claim 17, further comprising flowing each of said slurry streams along a circular path inside said feedwell body, the feeding of each of said slurry streams to said feedwell body including providing each of said slurry streams with an upward velocity component at an inner boundary of a substantially circular flow path and a downward velocity component at an outer boundary of said circular flow path.

\* \* \* \* \*